United States Patent [19]

Dunbar

[11] 4,429,858
[45] Feb. 7, 1984

[54] ELECTRICAL TRANSMISSION SYSTEM CONDUCTOR INSTALLATION TECHNIQUE

[75] Inventor: David R. Dunbar, Wilmington, N.C.
[73] Assignee: Interpace Corporation, Whippany, N.J.
[21] Appl. No.: 316,794
[22] Filed: Nov. 2, 1981

Related U.S. Application Data

[62] Division of Ser. No. 139,048, Apr. 10, 1980, Pat. No. 4,312,495.

[51] Int. Cl.³ ............................................ B65H 59/00
[52] U.S. Cl. ........................................ 254/134.3 PA
[58] Field of Search ............... 254/134.3 PA, 134.3 R; 248/63; 174/40 R; 24/135 R; 294/78 R, 78 A, 74

[56] References Cited

U.S. PATENT DOCUMENTS

| | | | |
|---|---|---|---|
| 1,158,688 | 11/1915 | Hopkins | 294/78 R |
| 1,794,998 | 3/1931 | Weinberger | 254/134.3 PA |
| 2,130,464 | 9/1938 | Jacobsen | 254/134.3 PA |
| 2,728,462 | 12/1955 | Fincher | 254/134.3 PA |
| 2,789,003 | 4/1957 | Wirkkald | 294/74 |
| 3,155,354 | 11/1964 | Lindsey | 174/40 R |
| 3,916,265 | 10/1975 | Friedman | 174/40 R |
| 4,178,470 | 12/1979 | Jean et al. | 254/134.3 PA |
| 4,239,272 | 12/1980 | Corbett | 294/74 |
| 4,281,213 | 7/1981 | Sciscione | 24/135 R |

FOREIGN PATENT DOCUMENTS

| | | | |
|---|---|---|---|
| 2461318 | 7/1976 | Fed. Rep. of Germany | 254/134.3 PA |
| 2063732 | 7/1971 | France | 174/40 R |

Primary Examiner—Robert C. Watson
Attorney, Agent, or Firm—Charles E. Baxley

[57] ABSTRACT

A typical embodiment of the invention is directed to a "Horizontal Vee" power transmission line conductor installation system. Typically, a connector protrudes from the insulator coupling. A cable clamp is releasably attached to the connector. An auxiliary cable seized in the clamp also is attached through cable grips to the line conductor. A come along transfers load from the line conductor to the cable to enable the slackened portion of the line conductor to be clipped by a suspension clamp and permanently joined to the connector. The auxiliary cable is released from the line conductor and removed from the connector in order to transfer the line conductor load back to the line conductor. This techniques avoids the need for cranes, jib poles and other erection equipment and also avoids imposing excessive forces on the electrical insulators during installation.

4 Claims, 6 Drawing Figures

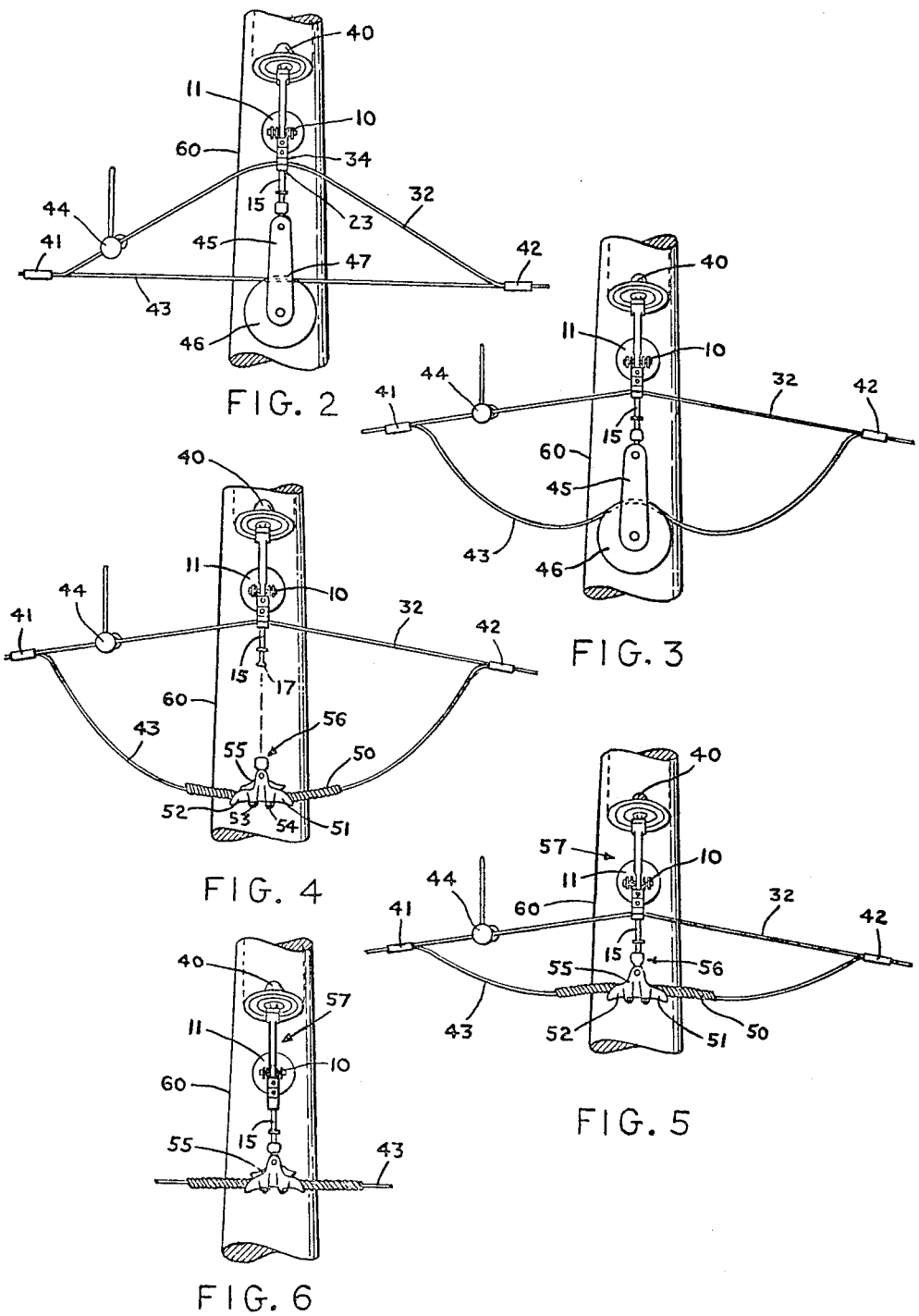

4,429,858

ELECTRICAL TRANSMISSION SYSTEM CONDUCTOR INSTALLATION TECHNIQUE

This is a division, of application Ser. No. 139,048, filed Apr. 10, 1980 now U.S. Pat. No. 4,312,495.

BACKGROUND OF THE INVENTION

This invention relates to methods and apparatus for temporarily supporting high voltage electrical transmission conductors during transmission system installation and, more particularly, to methods and apparatus for temporarily supporting high voltage electrical conductors while they are being clipped to high voltage insulator assemblies on a power transmission pole by means of an auxiliary cable and conductor clipping aid, and the like.

For a number of reasons, of which cost and environmental considerations are perhaps paramount, electrical utility companies have been striving to reduce the width of the right-of-way that is required to transmit electrical power. There also is a further need to improve the physical and aesthetic appearance of electrical power transmission systems.

Toward satisfying these ends, the "Horizontal Vee" electrical transmission system that is described in U.S. Pat. No. 3,002,043 granted Sept. 26, 1961 to R. I. Jenner et al. for "Electrical Transmission System" has been quite successful. As described in the Jenner et al. patent, a suspension insulator is connected to an electrical transmission system pole in a manner that enables the suspension insulator to extend from the pole in a downward and outward direction. The downwardly and outwardly protruding end of the suspension insulator is joined to one end of a horizontal strut insulator, the opposite end of the strut insulator being connected directly to the power transmission system pole. The combined suspension and strut insulators form the "Horizontal Vee" and it is the junction of the two insulators that form this vee to which the line conductor is attached.

Although this "Horizontal Vee" installation has been widely accepted and very successful in reducing right-of-way width requirements for a given power rating, there is, nevertheless, a further need to simplify line conductor insulation procedures in order to reduce over-all system installation costs.

Typically, a crane or jib pole temporarily supports the line conductor while the conductor is being permanently clamped to the "Horizontal Vee" insulators on the transmission pole. This use of jib poles or cranes to temporarily lift and hold the conductor is expensive in terms of personnel and equipment, as well as being a tedious and time-consuming process. This technique, moreover, has the further disadvantage of imposing abnormal loads during installation on the pole structure. Clearly, there is a need for improved methods and apparatus for mounting line conductors to "Horizontal Vee" power transmission systems.

BRIEF SUMMARY OF THE INVENTION

Illustratively, a clevis and sheave combination is suspended from a connector or support rod that protrudes downwardly from the junction between the suspension and strut insulators on a transmission system pole. The line conductor is drawn through the clevis to bear upon and be tangent to the grooved upper surface of the sheave. Cable grips are attached to the line conductor on opposite sides of the sheave to enable an auxiliary cable or wire rope to pass through the aperture in a clipping aid clamp which is attached to the connector. A "come-along," which also is attached to the wire rope, is manipulated to tighten the auxiliary cable and produce some slack in the portion of the line conductor that is seized between the cable grips.

With sufficient slack provided, the clevis and sheave combination is dismounted from the connector to permit a suspension clamp to be attached to the line conductor at the same point as the point of tangency between line conductor and the groove in the sheave. The suspension clamp on the slack portion of the line conductor then is attached to the connector which protrudes downwardly from the junction between the two insulators. The come-along is removed and the wire rope with its associated cable grips also is removed, transferring the line conductor load directly to the "Horizontal Vee" assembly.

A further salient feature of the invention is the temporary addition of a clamp or clipping aid to the connector. This clipping aid accommodates the auxiliary cable, the cable grips and the come-along.

These and other features of the invention are shown in more complete detail in the following description of a preferred embodiment of the invention when taken in conjunction with the drawing. The scope of the invention, however, is limited only by the claims.

BRIEF DESCRIPTION OF THE DRAWINGS

FIGS. 2 through 6 are side elevations of a sequence of steps for practicing a preferred embodiment of the invention in connection with the device that is shown in FIG. 1.

DETAILED DESCRIPTION OF THE INVENTION

Figure 1:
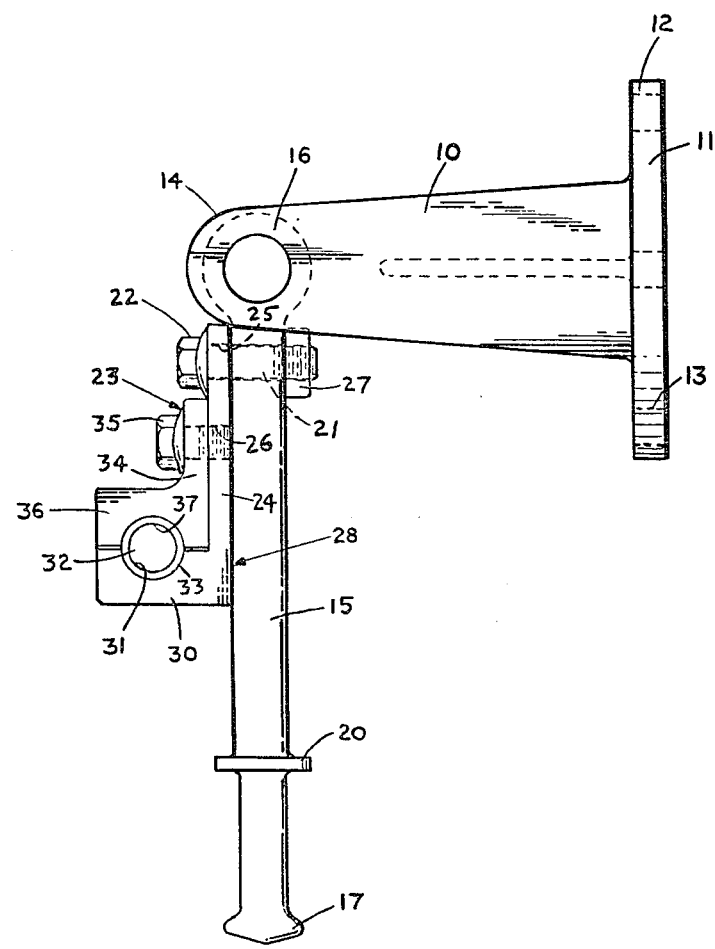
FIG. 1 is a front elevation of a typical assembly for mounting a line conductor to a transmission system insulator assembly in accordance with the principles of the invention.

For a more detailed understanding of the invention, attention is invited to FIG. 1 which shows a bracket 10 that has a base 11 in which four apertures 12 and 13 are formed to accommodate the shanks of bolts (not shown in FIG. 1). These bolts attach the bracket 10 to a strut insulator (also not shown in FIG. 1) of a "Horizontal Vee" high voltage insulator assembly. The bracket 10 protrudes from the base 11 and terminates in a bifurcated end 14 which forms a clevis that accommodates a connector 15.

As shown in FIG. 1, one end of the connector 15 has an eye 16 that is pinned within the bifurcated end 14 of the bracket 10. The shank of the connector 15 protrudes in a downward direction from the bifurcated end 14 of the bracket 10. The lowermost end of the connector 15 terminates in an end that is finished with ball joint 17. A flange 20, moreover, is formed on the shank of the connector 15 about one quarter of the distance from the ball joint 17 toward the eye 16.

The shank of the connector 15 also is provided with an aperture 21 that is near the eye 16 of the connector, but spaced slightly below the bracket 10. The aperture 21 accommodates a bolt 22 that temporarily joins an "L" shaped two-component assembly comprised of members 23 and 28 to the connector 15.

In accordance with a salient feature of the invention, member 28 has an upright and vertically oriented leg 24 and is provided with apertures 25 and 26. The aperture 25 is in axial alignment with the aperture 21 in the connector 15 in order to accommodate the shank of the bolt 22. Thus bolt 22 and nut 27 fasten the assembly temporarily to the connector 15. Member 28 has a base 30 which is flat on the lower side that is adjacent to the ball joint 17 and has a groove 31 on the upper side that is oriented toward the bolt 22.

A cable or wire rope 32, which will be described subsequently in more complete detail, is lodged in the groove 31. Note, moreover, that the ends of the groove 31 are provided with a chamfer 33. A keeper member 23 is attached to the aperture 26 in member 28 by means of a bolt 35, or the like, in the vertical leg 34. The keeper 23 also has a general "L" shape that nests within the crook formed by the vertical leg 24 and the base 30 of member 28.

As illustrated, the horizontal leg 36 of the keeper 23 also is provided with a chamfered groove 37 that is opposite to and in alignment with the groove 31 in member 28. In this way, member 28 and the keeper 23 clamp the wire rope 32 to the connector 15 and the bracket 10. This clamping does not prevent relative movement in an axial direction between the cable 32 and the combined keeper 23 and member 28 as well as the shank 15. It should also be noted that the keeper 23 and member 28 combination form a clipping aid that can be removed from the connector 15 and the bracket 10 as described subsequently in more complete detail.

Attention now is invited to FIG. 2, which shows member 28 and the keeper 23 attached to the connector 15, which is mounted by means of the bracket 10 and the base 11 at the juncture between a suspension insulator 40 and a strut insulator that is directly behind the base 11 of the bracket 10. The extremities of the wire rope 32 are provided with cable grips 41 and 42 which temporarily clamp the wire rope to a line conductor 43. A come-along 44 also is accommodated on the wire rope 32 between the assembly of keeper 23 and member 28 and the cable grip 41, also as shown in FIG. 1.

A clevis 45 is connected to the ball joint (not shown in FIG. 2) at the downwardly depending extremity of the connector 15 in order to support a rotatable sheave 46. The sheave 46 is provided with an annular groove 47 to which the line conductor 43 is tangent. The line conductor 43, moreover, is marked at its midpoint between the cable grips 41 and 42 at that point of tangency with the groove 47 in the sheave 46.

Turning now to FIG. 3, it can be seen that the come-along 44 has been manipulated to enable the tension in the line conductor 43 to be taken up by the wire rope 32 and permit the section of the line conductor 43 that is clamped between the cable grips 41 and 42 to hang slack on either side of the sheave 46. The sheave 46 and the clevis 45 are removed from the connector 15 to enable the portion of the line conductor 45, between the cable grips 41 and 42, to hang in an arcuate bow.

As shown in FIG. 4, the portion of the line conductor 43 that is seized between the cable grips 41 and 42 may be wrapped with a serving of armor rods 50 in the vicinity of the marked tangency point. A suspension clamp 51 is attached to the whipped portion of the line conductor 43. As shown in the drawing, the suspension clamp 51 has a groove base 52 in which the whipping and the immediately adjacent portion of the line conductor 43 are secured by means of a pair of inverted U bolts 53 and 54. The suspension clamp also is provided with an apertured clevis 55 which is coupled to a fitting 56. The head of the fitting 56 which protrudes about the apertured clevis 55 of the suspension clamp is provided with a socket (not shown in the drawing) that can be fastened to the ball joint 17 on the end of the connector 15.

Thus, as illustrated in FIG. 5, the ball joint 17 (FIGS. 1, 2, 3 and 4) of the connector 15 is fitted into the mating socket within the fitting 56 to join the suspension clamp 51 and the portion of the line conductor 43 that is seized by the clamp 51 to the assembly for the "Horizontal Vee" installation. Note that following the joining of 17 and 56, the come-along 44 that is shown in FIGS. 2,3 and 4 can be removed from the wire rope 32. The cable grips 41 and 42 are released from the line conductor 43 to enable the clamp 51, the fitting 56 and the connector 15 with its associated bracket 10 to bear the full load of the associated portion of the line 43. Thus, FIG. 6 shows a completed line conductor installation in which the conductor 43 and its whipped portion that is seized within the suspension clamp 51 is sustained by the connector 15, the bracket 10 and the "Horizontal Vee" assembly 57 which, in turn, transfers the entire load to the pole 60.

Turning once more to FIG. 1, it should be noted that the cable 32 is removed from the connector 15 by unthreading the bolt 22 from the nut 27 to release the clipping aid combination of member 28 and keeper 23 from the connector 15.

Although the invention has been described in conjunction with a "Horizontal Vee" installation, it can also be used effectively where a conductor is suspended from a vertical string of suspension insulators or a cantilevered post insulator. These constructions are well known in the art. Additionally, the clipping aid has been shown composed of two components, both attached to the connector. Where desirable, the supporting component 24 could be an integral part of connector 15.

Consequently, there is provided in accordance with the invention, a method and apparatus for securing line conductors to electrical high voltage insulator assemblies without the use of jib poles, cranes or other costly construction equipment. This not only reduces construction costs, but also avoids imposing extraordinaly loads on the "Horizontal Vee" assembly during the line conductor installation.

I claim:

1. In a power transmission system comprising a pole for supporting a line conductor, a suspension insulator having a first end connected with the pole and a second end extending from said pole in a downward and outward direction, and a strut insulator extending from said pole to form a junction with the suspension insulator at the second end thereof, the improvement being a conductor erection system comprising:

a bracket mounted to said junction of said insulators;

a connector suspended from said bracket, said connector having an upper end and a lower end;

a cable clamp detachably secured to said connector near said upper end thereof, said cable clamp having an aperture disposed with its axis parallel to the direction of said conductor and through which aperture a cable can be slid;

a cable secured by said cable clamp, both ends of said cable being attached to the line conductor, said cable being slidably disposed within said cable clamp for raising said conductor;

means for transferring load from the line conductor to said cable, said transferring means including a sheave assembly detachably securable to the lower end of said connector for temporary support of said conductor; and a conductor clamp securable to said line conductor for attachment of the line conductor to the lower end of said connector.

2. A clipping aid for a power transmission system including an electrical insulator for support of a line conductor, said clipping aid comprising a bracket attached to said electrical insulator, a connector having an upper end and a lower end and being suspended by its upper end from said bracket, a conductor clamp, said connector having means for attachment of said conductor clamp for sustaining a line conductor, said clipping aid further comprising means including a cable for temporarily supporting the line conductor, said supporting means being releasably attached to said connector near said upper end independently of said attachment of said conductor clamp, said clamp attachment means being located at the lower end of said connector for securing said conductor clamp to the lower end of said connector, said temporary supporting means including a cable clamp detachably securable to said connector near its upper end and having an aperture therein through which said cable can be slid in a direction parallel to said conductor for raising said conductor, whereby the weight of said conductor can be transferred from said temporary supporting means to said conductor clamp.

3. A clipping aid according to claim 2 wherein said bracket comprises an outer end bifurcated to form a clevis, said clamp attachment means being formed at the bottom end of said connector and having a base at said bottom end for attachment to said line conductor via said conductor clamp.

4. A clipping aid according to claim 3 wherein said supporting means further comprises a body for temporary attachment to said connector, and a keeper attached to said body for engaging a cable therebetween, said keeper having an arcuate rim for forming part of said aperture for the slidable support of said cable.

* * * * *